(12) United States Patent
Papanikolaou et al.

(10) Patent No.: US 7,065,134 B2
(45) Date of Patent: Jun. 20, 2006

(54) ADAPTIVE EQUALIZER WITH LARGE DATA RATE RANGE

(75) Inventors: Vasilis Papanikolaou, Toronto (CA); Apu Sivadas, Burlington (CA); Atul Gupta, Mississauga (CA); Hossein Shakiba, Richmond Hill (CA)

(73) Assignee: Gennum Corporation, Burlington (CA)

( * ) Notice: Subject to any disclaimer, the term of this patent is extended or adjusted under 35 U.S.C. 154(b) by 744 days.

(21) Appl. No.: 09/940,053

(22) Filed: Aug. 27, 2001

(65) Prior Publication Data

US 2003/0043897 A1    Mar. 6, 2003

(51) Int. Cl.
*H03K 5/159* (2006.01)
*H03H 7/30* (2006.01)

(52) U.S. Cl. ............... 375/229; 375/232; 375/345; 455/234.1; 455/245.1; 33/18; 33/18 R

(58) Field of Classification Search ............... 375/229, 375/230, 232–234, 345, 346, 348, 285, 344, 375/350; 341/110, 139; 700/41–43; 333/18, 333/28 R; 455/234.1, 245.1
See application file for complete search history.

(56) References Cited

U.S. PATENT DOCUMENTS

| | | | |
|---|---|---|---|
| 4,590,394 A | | 5/1986 | Pace |
| 4,862,103 A | | 8/1989 | Funada |
| 5,099,366 A | | 3/1992 | Ahlgrim |
| 5,184,292 A | * | 2/1993 | Schneider ............... 700/42 |
| 5,606,284 A | | 2/1997 | Tamesue et al. |
| 5,761,251 A | | 6/1998 | Wender |
| 5,940,441 A | * | 8/1999 | Cranford et al. ............ 375/232 |

(Continued)

FOREIGN PATENT DOCUMENTS

| | | |
|---|---|---|
| EP | 0 437945 | 7/1991 |
| EP | 0 611059 | 8/1994 |
| EP | 1 133 084 A1 | 9/2001 |
| WO | WO 98/45955 | 10/1998 |

OTHER PUBLICATIONS

MAX3801: http://pdfserv.maxim-ic.com/arpdf/MAX3801.pdf, 3.2 Gbps Adaptive Equalizer.

(Continued)

*Primary Examiner*—Khai Tran
*Assistant Examiner*—Edith Chang
(74) *Attorney, Agent, or Firm*—Jones Day

(57) ABSTRACT

An adaptive equalizer with a large data rate range is provided. The equalizer comprises an equalizer core, a slicer and an automatic gain control (AGC) loop. The equalizer core is coupled to an input signal from a transmission medium and applies a transfer function to the input signal to compensate for losses incurred in the transmission medium in order to generate a core output signal. The equalizer core is also coupled to a bandwidth control signal that controls a bandwidth of the transfer function. The slicer is coupled to the core output signal and converts the core output signal to a digital output signal having a fixed digital output swing that approximates a transmission swing of the input signal prior to transmission over the transmission medium. The AGC loop is coupled to the core output signal and the digital output signal and compares the core output signal with the digital output signal in order to generate the bandwidth control signal.

38 Claims, 8 Drawing Sheets

U.S. PATENT DOCUMENTS

| | | | |
|---|---|---|---|
| 6,148,046 A | * | 11/2000 | Hussein et al. ............. 375/345 |
| 6,169,764 B1 | | 1/2001 | Babanezhad |
| 6,304,615 B1 | | 10/2001 | Webster |
| 6,438,162 B1 | | 8/2002 | Boyd et al. |

OTHER PUBLICATIONS

A. J. Baker, "An Adaptive Cable Equalizer for Serial Digital Video Rates to 400 Mb/S," IEEE ISSCC, pp. 174-175 1996.

M. H. Shakiba, "A 2.5 Gb/s Adaptive Cable Equalizer", IEEE ISSCC, pp. 396-397, 1999.

Watanabe et al., "Adaptive Line Enhancers with Discriminated Structures", Electronics and Communications in Japan, Part 3, vol. 79, No. 11, 1996, pp. 57-68 XP 000681160, New York.

Guinea, Stacey, "Analog and Digital Circuit Techniques in Telecom Design for ISDN", International Symposium on Circuits and Systems, pp. 137-140, XP000795192 New York.

* cited by examiner

ADAPTIVE EQUALIZER WITH LARGE DATA RATE RANGE

BACKGROUND

1. Field of the Invention

This invention relates generally to the field of equalizers. More particularly, the invention provides an adaptive equalizer with a large data rate range. The invention is particularly well suited for use in digital communication components, such as receivers, equalizers, high-speed backplanes, Printed Circuit Board Trace equalizers, cable equalizers, automatic gain control devices, and other types of digital communication components.

2. Description of the Related Art

The use of an equalizer to compensate for loss resulting from the non-idealities of a transmission medium is known. FIG. 1 is a block diagram showing an equalizer 12 implemented in a typical digital communications system 10 in which an input signal 14 is transmitted through a transmission medium 16. Typical transmission media 16 used for transmission of digital signals over relatively short distances include, for example, coaxial cables and printed circuit board (PCB) traces. These, and other known transmission media, typically cause significant frequency dependant losses in digital signals being transmitted over the media and consequently distort the digital data, often resulting in pulse spreading and interference between neighboring pulses (known as intersymbol interference). In addition, the input signal 14 is further corrupted during transmission by noise 18 induced by the transmission medium 16. The equalizer 12 regenerates the transmitted signal 20 by providing gain to compensate for the frequency dependant losses caused by the transmission medium 16 (up to some maximum length) while preferably minimizing the effect of the noise 18. This function is typically achieved by applying a transfer function to the received signal 20 that approximates the inverse of the transmission losses.

FIG. 2 is a graph 30 showing the loss (in dB) incurred in the transmission medium 16, plotted as a function of both the length (l) of the medium 16 and the frequency (f) of the signal. Generally, the loss over a transmission medium (such as a coaxial cable or PCB trace) may be approximated in the frequency domain by the following equation:

$$L(f) = l^{-l(k_s\sqrt{f} + k_d f)};$$

where f is the frequency, l is the length of the transmission medium, $j = \sqrt{-1}$, $k_s$ is the skin effect loss constant of the transmission medium, and $k_d$ is the dielectric loss constant of the transmission medium. The value of L(f) is plotted in FIG. 2 for transmission media of two different lengths: Length 1 (shorter) and Length 2 (longer). As the length (l) of the transmission medium increases, the loss increases. In addition, as the frequency (f) increases, the loss increases.

To counteract the transmission loss shown in FIG. 2, an equalizer 12 should have a frequency characteristic that is the inverse of the loss function of the transmission medium. The inverse loss function may be approximated as follows:

$$\frac{1}{L(f)} = G(f) = 1 + KH(f);$$

where K is a control variable that is proportional to the length (l) of the transmission medium. The value of K typically varies from zero to unity (or some other constant) as the transmission medium approaches its maximum length.

FIG. 3 is a graph 40 showing the inverse loss function G(f), plotted in dB on the same axes as the loss function L(f). As shown in this figure, the inverse loss function G(f) provides a frequency dependant gain equivalent to the loss L(f) incurred in the transmission medium. The characteristics of the inverse loss function G(f) are explained in more detail in U.S. patent application Ser. No. 09/055,515 (hereinafter referred to as the "'515 Application") which is owned by the Assignee of the present application, and which is hereby incorporated into the present application by reference.

FIG. 4 is a block diagram of an equalizer core 50 that implements the inverse loss function G(f). The equalizer core 50 includes a transfer function block 52 (H(f)), a multiplier 58, and an adder 56. This circuit 50 applies variable gain to an input signal 57 by applying the transfer function H(f) in order to generate a resultant signal and then by multiplying the resultant signal from the transfer function block 52 by a gain control signal 58 (K). The gain control signal 58 (K) preferably controls the amount of gain applied by the transfer function H(f) by multiplying the output of the transfer function block 52 by a factor typically varying from zero (0) to unity (1) depending upon the length (l) of the transmission medium 16. For instance, when the transmission medium 16 is at a maximum length, the transfer function H(f) is generally multiplied by unity (1) to provide the maximum gain. The output of the multiplier is then summed with the input signal 57 by the adder 56 in order to produce an equalized output signal 59 corresponding to the inverse loss function (1+KH(f)). An exemplary circuit for implementing the transfer function block 52 is described in the above-referenced '515 Application.

FIG. 5 is a block diagram of an alternative equalizer core 60 that implements a bandwidth-limited inverse loss function. In this circuit 60, a low-pass filter 62 is added to the equalizer core 50 shown in FIG. 4 to reduce noise encountered in the transmission medium 16. This alternative implementation 60 reduces the amplification of high frequency noise, and thus increases the signal-to-noise ratio (SNR) of the equalized output signal 64. A graphical representation 70 of the bandwidth-limited inverse loss function 72, plotted on the same axes as the loss function L(f) is shown in FIG. 6.

FIG. 7 is a block diagram showing a multiple-stage equalizer core 80 having three equalizer stages 82, 84 and 86, each of which implements the inverse loss function G(f). The three cascaded equalizer stages 82, 84 and 86 are preferably the same as the equalizer core 50 shown in FIG. 4. Alternatively, the multiple-stage equalizer core 80 could include a plurality of bandwidth-limited stages as shown in FIG. 5, or other types of cores. In any case, each equalizer stage 82, 84 and 86 includes a gain control signal (K1, K2 or K3) that is used to control the gain implemented by the transfer function H(f) in proportion to the length of the transmission medium 16. The advantages of utilizing a multiple-stage equalizer core are explained in detail in the '515 Application.

Operationally, each stage 82, 84 and 86 in the multiple-stage equalizer core 80 is configured to equalize signals transmitted over transmission media up to a percentage of the total maximum transmission medium length. For instance, if the multiple-stage equalizer core 80 is capable of equalizing losses incurred in transmission media of up to 300 meters, then each core stage 82, 84, and 86 will typically be configured to equalize losses in transmission media of up to 100 meters. The stages 82, 84 and 86 are then cascaded such that they operate sequentially to equalize transmission media of up to 300 meters.

FIG. 8 is a graph 90 showing how the gain control signals K1, K2 and K3 in the multiple-stage equalizer core 80 are varied according to the length of the transmission medium. The value K, shown along the x-axis in FIG. 8, represents the percentage of the transfer function H(f) that needs to be applied to an input signal in order to supply the gain necessary to equalize a transmission medium of a given length. As the transmission medium length increases, the gain necessary to equalize the transmission losses in the medium also increases. FIG. 8 shows that the gain control signals K1, K2 and K3 cause gain to be supplied sequentially by the equalizer stages 82, 84 and 86. For instance, if each equalizer stage 82, 84 and 86 is capable of providing the necessary gain to equalize 100 meters of a transmission medium, then the gain control signal K1 would typically control the gain necessary for transmission media from 0 to 100 meters, the combined gain control signals K1 (at unity) and K2 would typically control the gain necessary for transmission media from 100 to 200 meters, and the combined gain control signals K1 (at unity), K2 (at unity) and K3 would typically provide the gain for transmission media from 200 to 300 meters. For example, if the transmission media were 120 meters in length and each equalizer stage 82, 84 and 86 can equalize 100 meters, then K1 would be at its maximum value (unity), K2 would be at the value necessary to cause the second equalizer stage 84 to equalize a 20 meter transmission medium, and K3 would be zero.

FIG. 9 is a block diagram showing an exemplary equalizer system 100 such as described in the referenced '515 Application. This equalizer system 100 includes an equalizer core 102, a slicer 104, an automatic gain control circuit (AGC) 106, a transmitter 108, and a transmission medium 110. The equalizer core 102 may be either a single-stage core as shown in FIG. 4 or 5 or a multiple-stage core as shown in FIG. 7, and operates, as described above, to compensate for the losses incurred in the transmission medium 110. The output 112 of the equalizer core 102 is coupled to the slicer 104, which converts the output signal 112 from the core 102 to a digital output signal 114 having a known swing (A) that approximates the swing (B) of the data sent from the transmitter 108. Since the swing (B) of the transmitted data is known and reproduced as the swing (A) of the digital output signal 114 from the slicer 104, the difference in energy between the equalizer core output signal 112 and the slicer output signal 114 approximates the energy lost in the transmission medium 110, which is proportional to its length. The AGC 106 compares the energy of the equalizer core output signal 112 with the energy of the digital output signal 114 from the slicer 104 to generate the gain control signal K.

The AGC 106 includes a core-side band-pass filter 116, a core-side envelope detector 118, a slicer-side band-pass filter 120, a slicer-side envelope detector 122, an adder 124, and a sequencer 126. Operationally, the AGC 106 filters the core and digital outputs 112 and 114 to mid-band frequencies using the band-pass filters 116 and 120. The advantage of filtering the core and digital outputs 112 and 114 to their mid-band frequencies is explained in detail in the '515 Application. Following this filtering function, the AGC 106 then detects the signal energy of the two band-limited signals with the envelope detectors 118 and 122. Finally, it determines the difference between the two signal energies with the adder 124, which provides the gain control signal K. If the equalizer core 102 is single-stage, then the gain control signal K is typically coupled directly to the core 102 to control the variable gain as described above. If, however, the equalizer core 102 is of the multiple-stage type, then the sequencer 126 is used to convert the gain control signal K from the adder 124 into a plurality of multiple-stage gain control signals Ki, such as K1, K2 and K3 described above with reference to FIGS. 7 and 8. In either case, the gain control signal(s) K (or Ki) enable the equalizer core 102 to equalize the core output signal 112 by forcing it to the same energy level as the digital output signal 114 from the slicer 104. A further description of the AGC 106 is provided in the above referenced '515 Application.

Typical equalizer systems, such as the equalizer system 100 described above with reference to FIG. 9, are configured to provide optimal equalization for data transmitted at a set data rate, or possibly for a narrow range of data rates. This restriction is generally the result of the different characteristics of the spectral interference in low data rate signals compared to that in high data rate signals. For example, if a low data rate signal were equalized in a typical equalizer system designed to provide optimal equalization at high frequencies, then the bandwidth of the equalizer would likely cause the equalizer output to be corrupted by noise.

SUMMARY

An adaptive equalizer with a large data rate range is provided. The equalizer comprises an equalizer core, a slicer and an automatic gain control (AGC) loop. The equalizer core is coupled to an input signal from a transmission medium and applies a transfer function to the input signal to compensate for losses incurred in the transmission medium in order to generate a core output signal. The equalizer core is also coupled to a bandwidth control signal that controls a bandwidth of the transfer function. The slicer is coupled to the core output signal and converts the core output signal to a digital output signal having a fixed digital output swing that approximates a transmission swing of the input signal prior to transmission over the transmission medium. The AGC loop is coupled to the core output signal and the digital output signal and compares the core output signal with the digital output signal in order to generate the bandwidth control signal.

DETAILED DESCRIPTION

Figure 1:
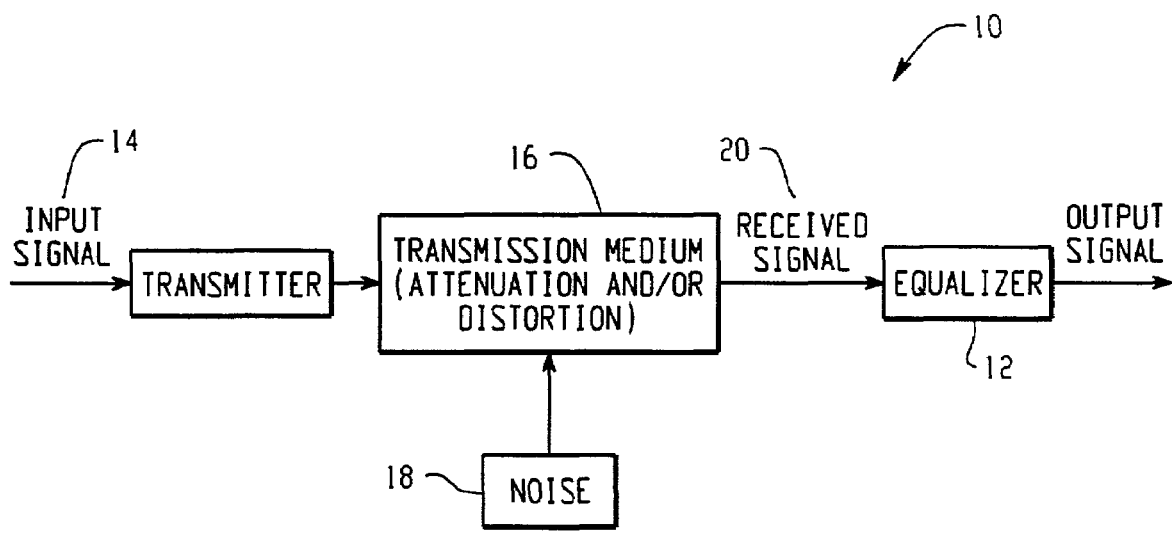
FIG. 1 is a block diagram showing the use of an equalizer in a typical serial digital data communication system in which an input signal is transmitted through a transmission medium.
Figure 2:
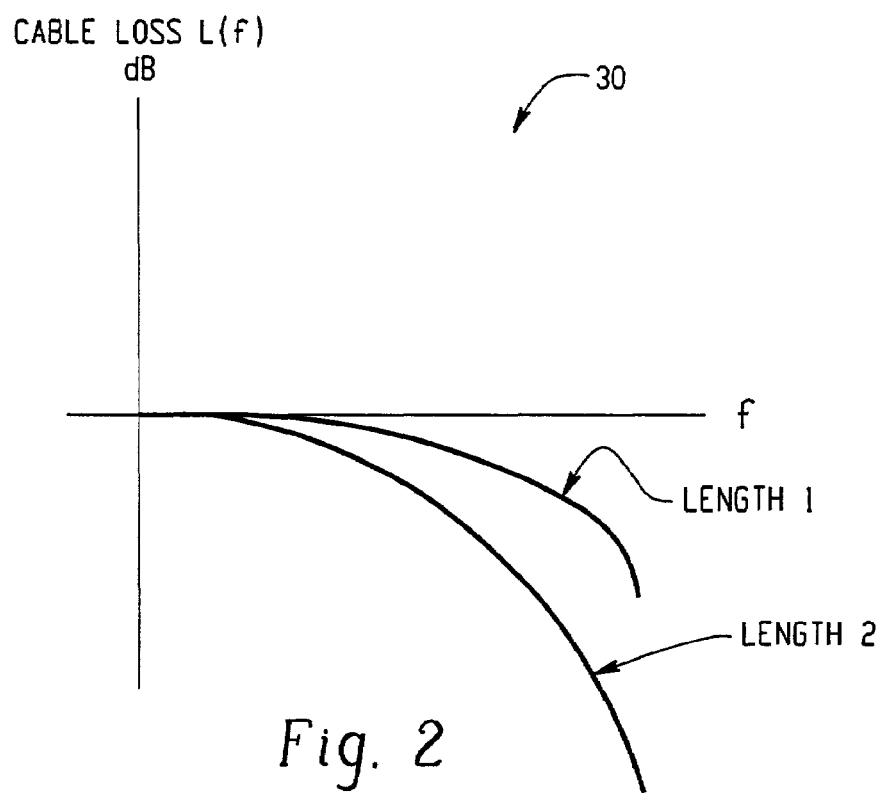
FIG. 2 is a graph showing the loss (in dB) incurred in the transmission medium, plotted as a function of both the length (l) of the medium and the frequency (f) of the signal.
Figure 3:
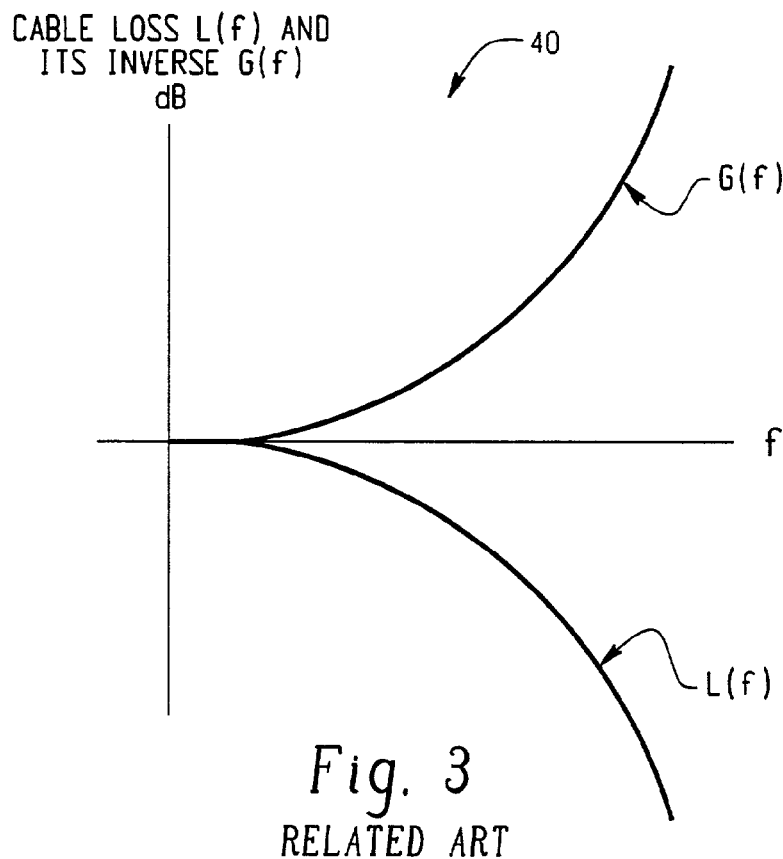
FIG. 3 is a graph showing the inverse loss function G(f), plotted on the same axes as the loss function L(f)
Figure 4:
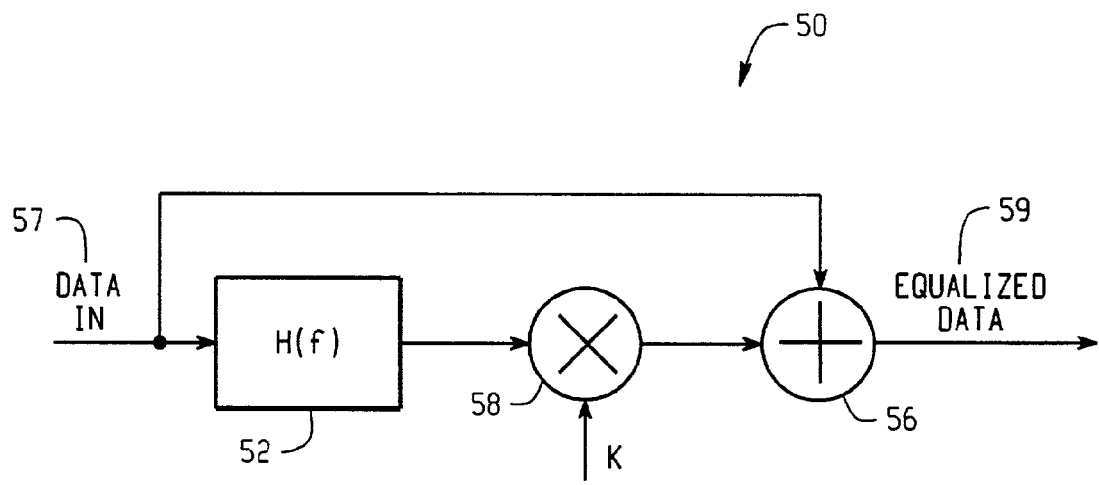
FIG. 4 is a block diagram of an equalizer core that implements the inverse loss function G(f)
Figure 5:
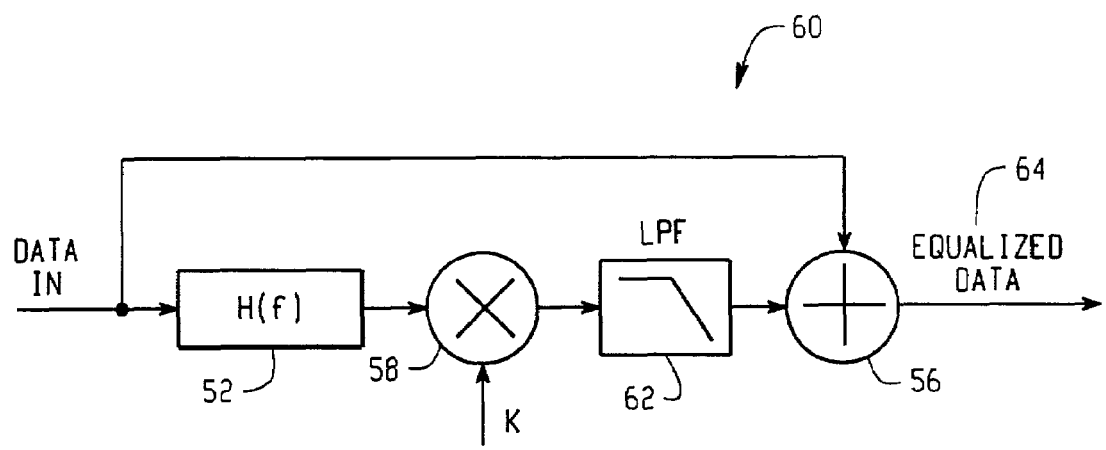
FIG. 5 is a block diagram of an alternative equalizer core that implements a bandwidth limited inverse loss function.
Figure 6:
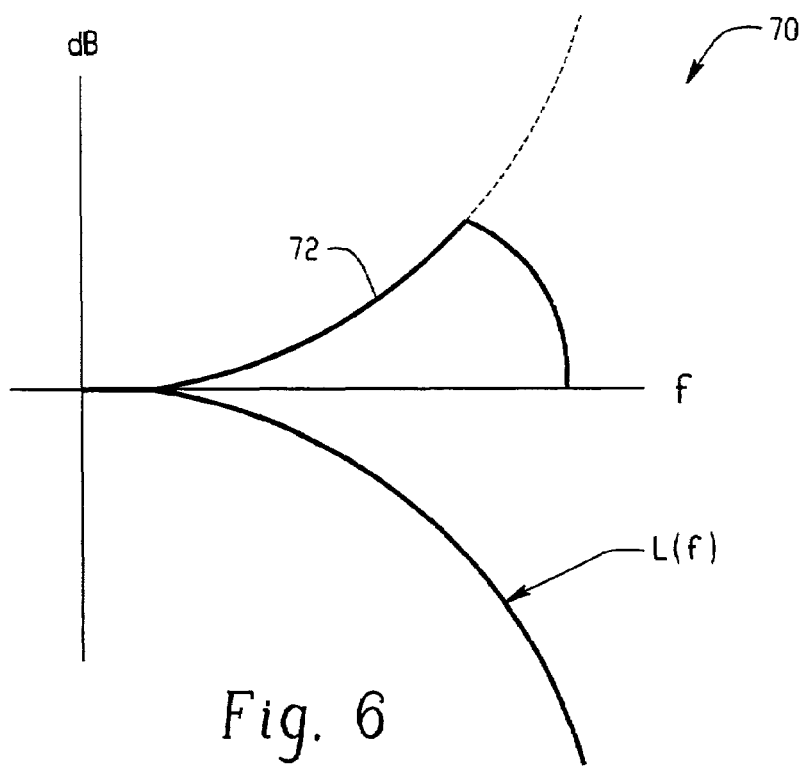
FIG. 6 is a graphical representation of the bandwidth limited inverse loss function, plotted on the same axes as the loss function L(f)
Figure 7:
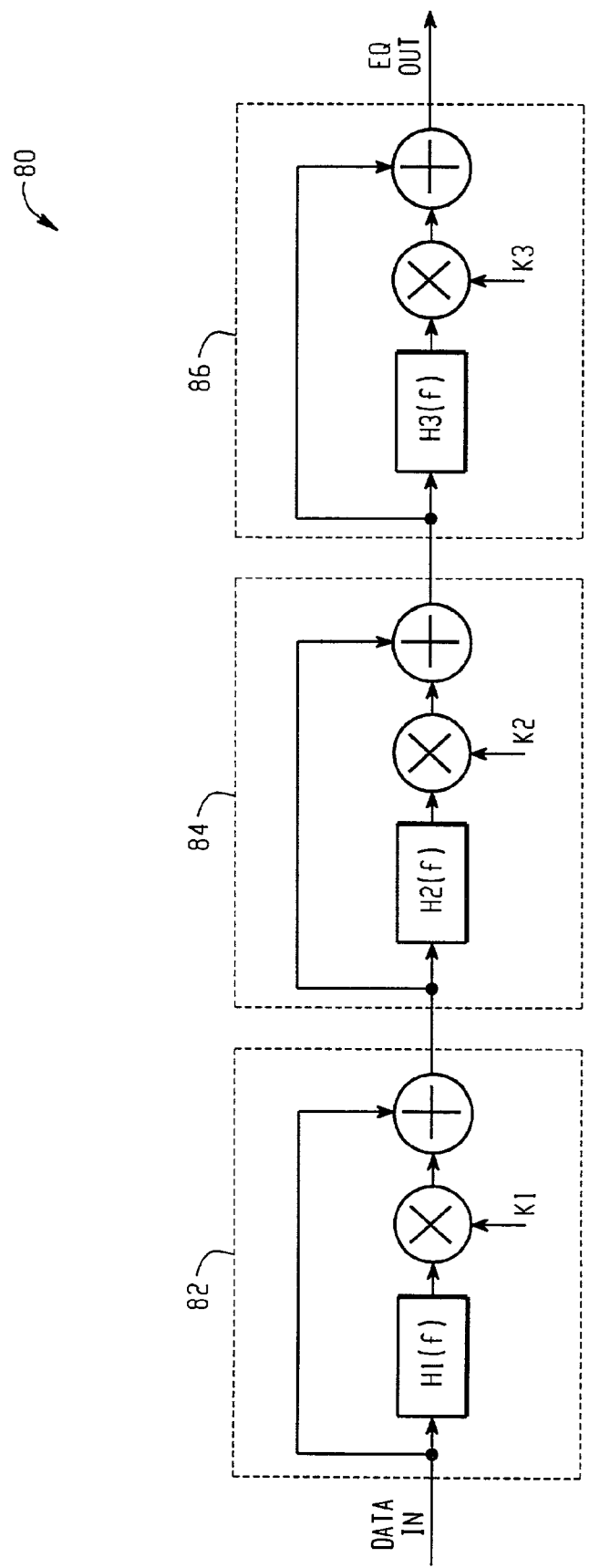
FIG. 7 is a block diagram showing a known multiple-stage equalizer core in which each stage implements the inverse loss function G(f)
Figure 8:
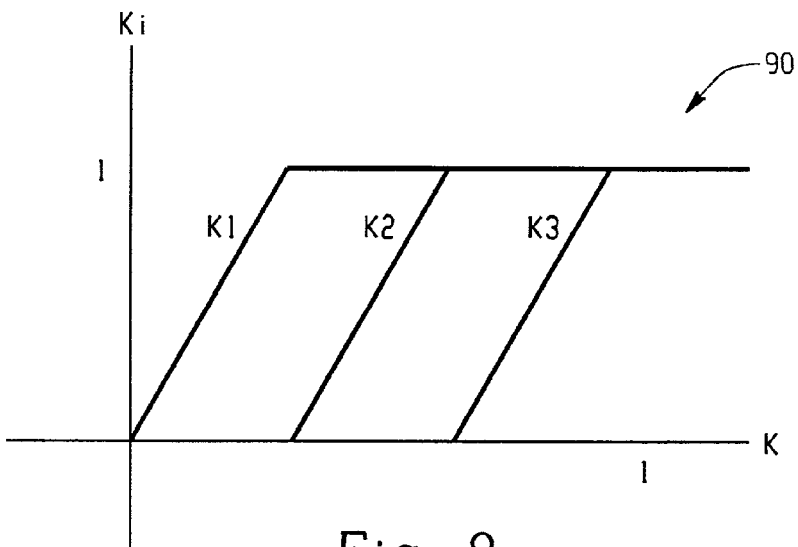
FIG. 8 is a graph showing how the gain control signals in the multiple-stage equalizer core are adjusted according to the length of the transmission medium.
Figure 9:
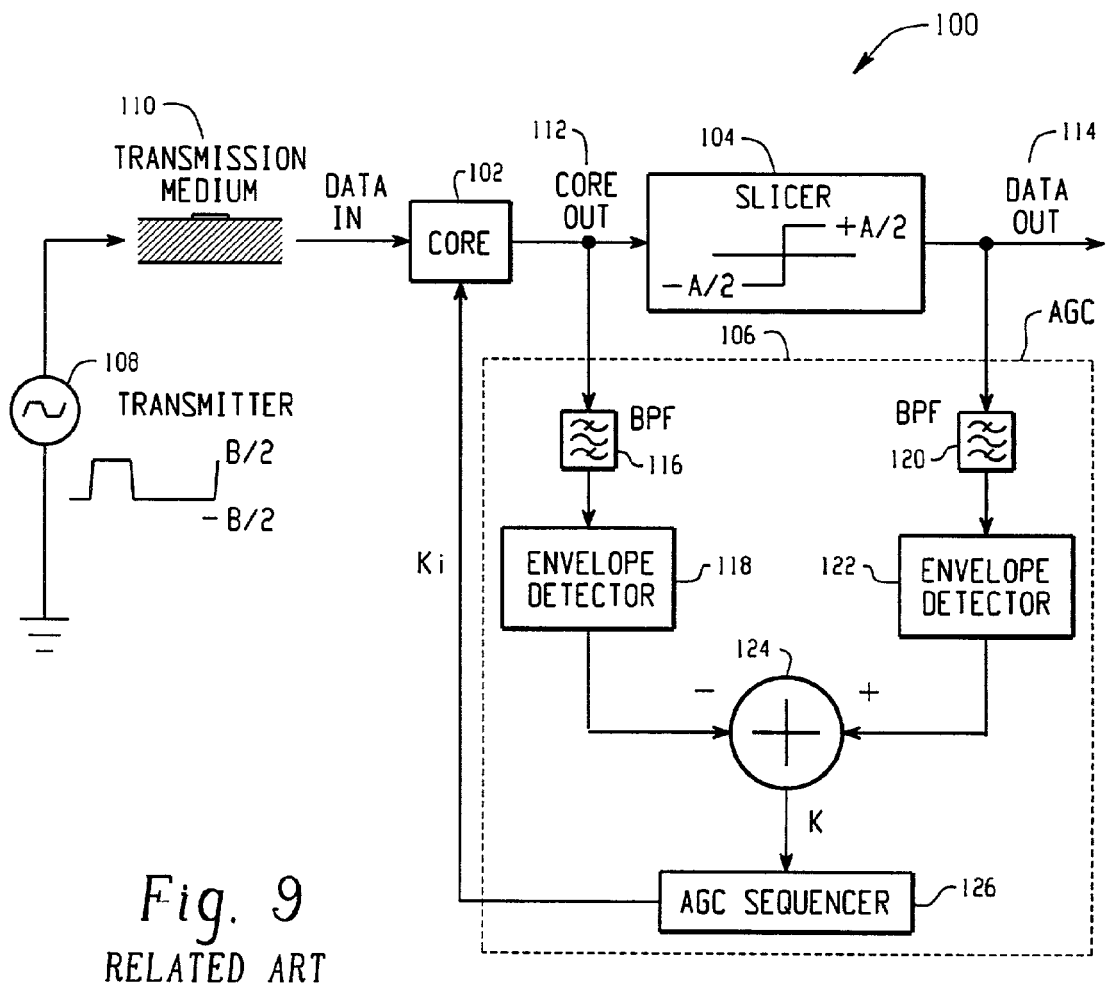
FIG. 9 is a block diagram showing an exemplary equalizer system such as described in the referenced '515 Application.
Figure 10:
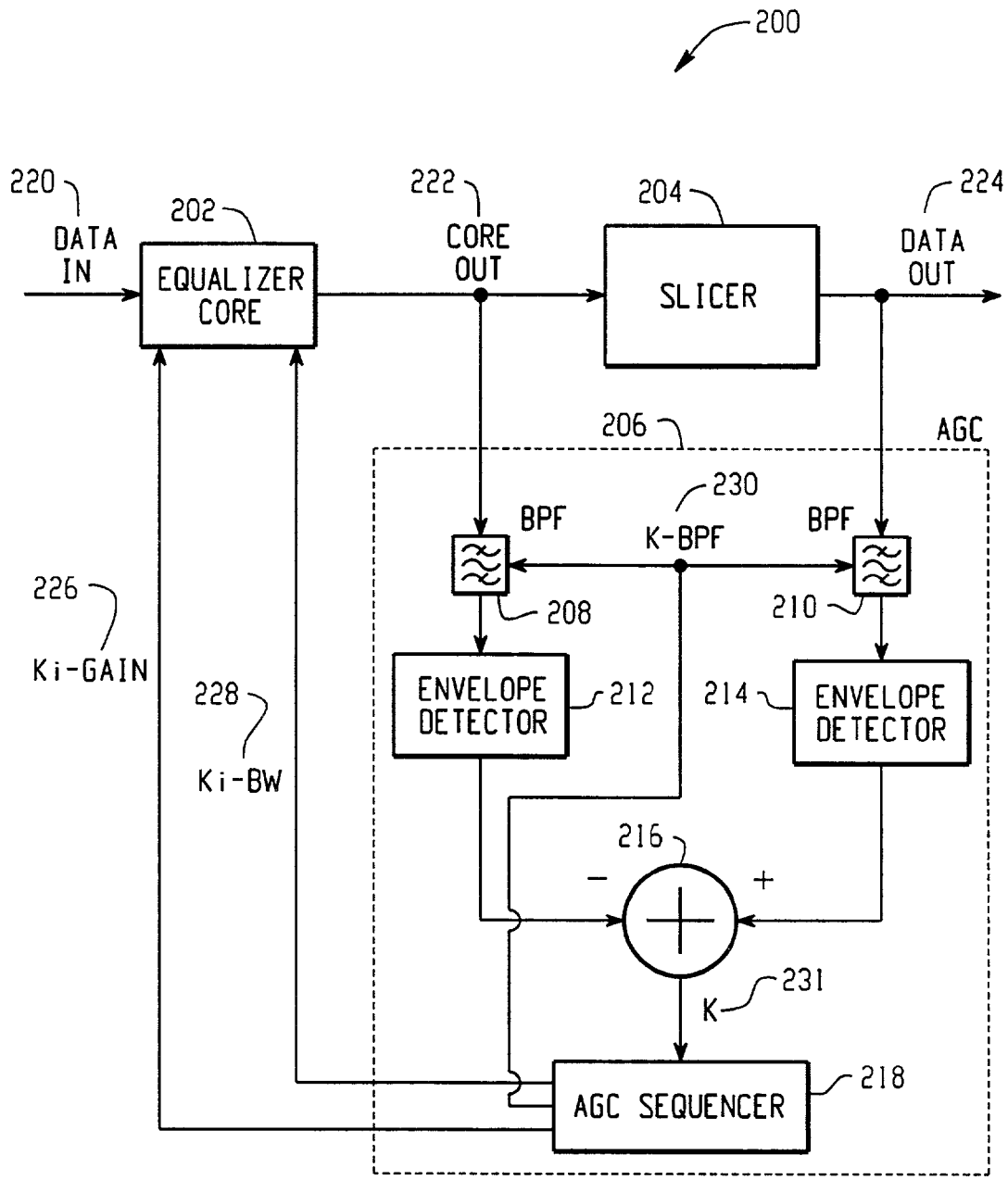
FIG. 10 is a block diagram showing a multiple data rate, adaptive equalizer according to an embodiment of the claimed invention.

Referring again to the drawing figures, FIG. 10 is a block diagram showing a multiple data rate, adaptive equalizer 200. The adaptive equalizer 200 includes an equalizer core 202, a slicer 204 and an automatic gain control circuit (AGC) 206. The AGC 206 includes two variable band-pass filters 208 and 210, two envelope detectors 212 and 214, an adder 216, and a sequencer 218. Operationally, the multiple data rate, adaptive equalizer 200 compensates for changes in the data rate of its input signal 220 by varying the bandwidths of the equalizer core 202 and the AGC 206.

The equalizer core 202 receives the input signal 220 from a transmission medium and generates a core output signal 222. The equalizer core 202 compensates for attenuation of the input signal 220 by applying an inverse loss function G(f) as described above with reference to FIGS. 2–8. The equalizer core 202 also receives a gain control signal (Ki-Gain) 226 and a bandwidth control signal (Ki-BW) 228 from the AGC 206 that respectively control the gain and bandwidth of the inverse loss function G(f). The gain and bandwidth control signals 226 and 228 are described below in more detail with reference to FIGS. 13–15. The core output signal 222 is then coupled to the slicer 204, which converts the equalized output 222 into a digital output signal 224 having a known swing that approximates the swing of the input signal 220 prior to its transmission. The AGC 206 compares the energy of the core output signal 222 with the energy of the digital output signal 224 to generate Ki-Gain 226 and Ki-BW 228, which are fed back to the equalizer core 202.

Within the AGC 206, the variable band-pass filters 208 and 210 respectively receive the equalizer output 222 and the digital output 224 as inputs to the AGC 206. The bandwidth of the variable band-pass filters 208 and 210 is adjusted by the band-pass control signal 230 (K-BPF) depending upon the data rate of the signal being equalized. The function and characteristics of the variable band-pass filters are discussed in more detail below with reference to FIGS. 11 and 12. Once the equalizer and digital outputs 222 and 224 have been band-limited by the variable band-pass filters 208 and 210, the signals are respectively coupled to the input of the envelope detectors 212 and 214, each of which generates an energy-level output proportional to the swing of its input signal. The envelope detectors 212 and 214 may be comprised of rectifiers, but could, alternatively, be any device or combination of devices capable of generating an output signal proportional to the energy (swing) of its input signal. The difference between the energy-level outputs of the envelope detectors 212 and 214 is then determined by the adder 216.

Preferably, the energy difference is calculated by coupling the energy-level output from one envelope detector 214 as a positive input to the adder, and the energy-level output from the other envelope detector 212 as a negative input to the adder. In this manner, the adder 216 generates a single-stage gain control signal (K) 231 that is proportional to the energy difference between the band-limited equalizer and digital outputs 222 and 224. Because this energy difference approximates the energy lost during transmission, the single-stage gain control signal (K) 231 settles to a value proportional to both the transmission loss and the length of the transmission medium. The single-stage gain control signal (K) 231 is coupled to the sequencer 218, which generates Ki-Gain 226 and Ki-BW 228, and also generates the band-pass filter control signal (K-BPF) 230 that is fed back to control the bandwidth of the variable band-pass filters 208 and 210.

The AGC 206 may be implemented using many types of controllers, such as a proportional type controller (P-Type), an integral type controller (I-Type), or a combination proportional-integral type (PI-type) controller. For example, to implement the AGC 206 as an I-Type controller, an integrator ($K_I/s$) could be coupled between the adder 216 and the sequencer 218.

Figure 11:
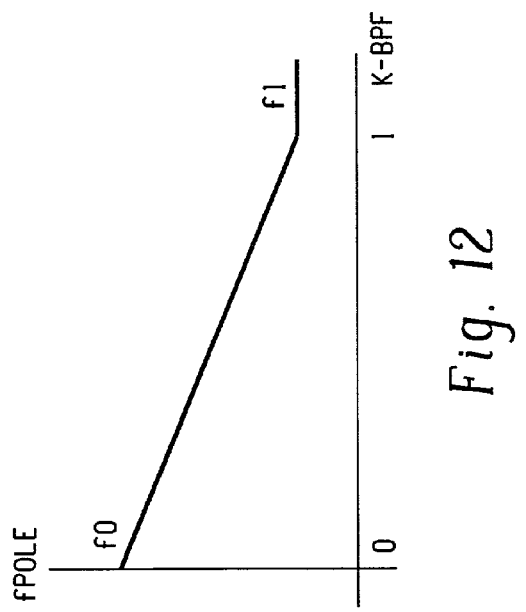
FIG. 11 is a graph showing the transfer function of a typical band-pass filter.
Figure 12:
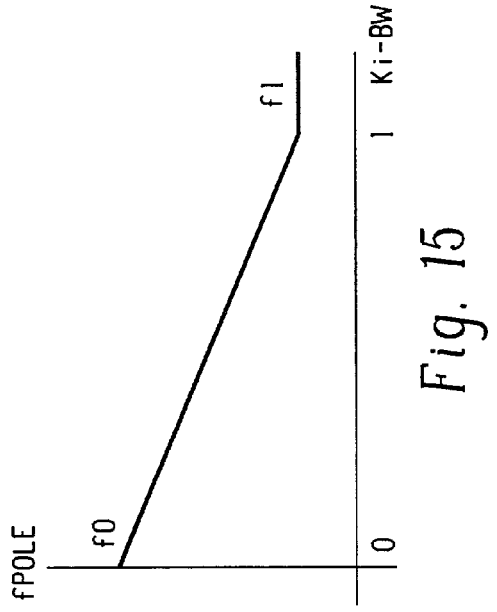
FIG. 12 is a graph showing how the transfer functions of the variable band-pass filters shown in FIG. 10 are altered by the band-pass control signal (K-BPF).

FIG. 11 is a graph showing the transfer function of a typical band-pass filter. FIG. 12 is a graph showing how the transfer functions of the variable band-pass filters 208 and 210 shown in FIG. 10 are altered by the band-pass control signal (K-BPF) 230. With reference to FIG. 10, the spectral characteristics of the two inputs 222 and 224 of the AGC 206 are frequency dependant and thus may vary significantly depending upon the data rate of the input signal 220. Therefore, in a system where the data transmission rate is not constant, the bandwidth of the band-pass filters 208 and 210 should preferably be adjusted such that the optimal performance of the AGC 206 is at the data rate of the equalizer input signal 220. Ideally, the transfer function of the variable band-pass filters 208 and 210 should center at half the data rate, and should also be narrow enough to minimize spectral interference. To approximate this ideal transfer function, the variable band-pass filters 208 and 210 each implement a variable transfer function in which the center frequency of the pass-band is optimized by adjusting the pole frequency ($f_{pole}$) of the filters' transfer function depending upon the data rate of the equalizer input 220. In alternative embodiments, the bandwidth of the variable band-pass filters 208 and 210 may be adjusted by varying the center frequency of the transfer function or by varying the Q (range from the zero frequency to the pole frequency) of the filter.

With reference to FIG. 11, the pole frequency ($f_{pole}$) of the transfer function for the variable band-pass filters 208 and 210 is adjusted by the band-pass control signal (K-BPF) 230, which is set by the sequencer 218 as a function of the single-stage gain control signal (K) 231. When the equalizer 200 settles to a steady state, the value of K is proportional to the loss incurred in the transmission medium. Because the transmission loss L(f) is a function of length (l), K is also proportional to the length of the transmission medium. The rate at which serial digital data may be transmitted over a transmission medium is dependant upon the length of the medium. Therefore, when choosing the data rate at which to transmit a signal, a person skilled in the art would set the data rate according to the length of the transmission medium. As a result, the value of K may also be used to approximate the data rate of the input signal 220 and set the band-pass control signal (K-BPF) 230. For instance, when the value of K indicates that data is likely being transmitted at a high data rate, K-BPF 230 is preferably set to widen the bandwidth of the variable band-pass filters 208 and 210. If, on the other hand, the value of K indicates that a long transmission medium is in use, then the data rate should be low and the bandwidth of the filters 208 and 210 is narrowed accordingly. For example, with reference to FIG. 12, the pole frequency ($f_{pole}$) of the band-pass filters 208 and 210 moves from its maximum value (f0) to its minimum value (f1) as the value of K-BPF 230 is increased in proportion to the single-stage gain control (K) (indicating a decrease in data rate).

Figure 13:
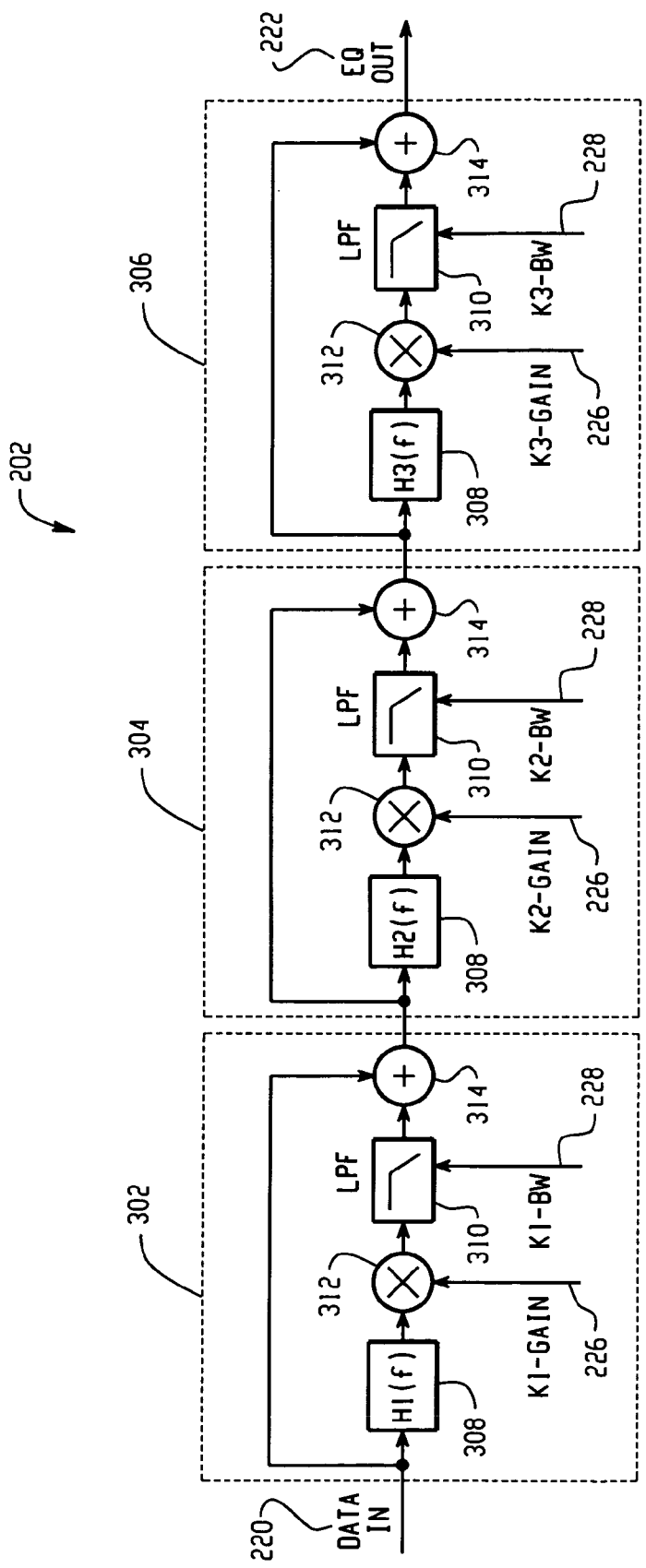
FIG. 13 is a block diagram showing an exemplary equalizer core having three cascaded stages.

FIG. 13 is a block diagram 300 showing an exemplary equalizer core 202 having three cascaded stages 302, 304 and 306. Each equalizer stage 302, 304 and 306 includes a transfer function block(H(f)) 308, a multiplier block 312, a variable low-pass filter 310, and an adder 314. The equalizer stages 302, 304 and 306 are each configured to equalize the losses incurred in a transmission medium by implementing the inverse of the transmission medium's loss function. The inverse loss function G(f) is equal to 1+KH(f), which is implemented in the equalizer stages 302, 304 and 306 by the transfer function block 308, the multiplier block 312, and the adder 314. In addition, the inverse loss function G(f) implemented by each equalizer stage 302, 304 and 306 is band-limited with a variable low-pass filter 310 to optimize the signal to noise ratio (SNR) of the equalizer output 222. This reduces the amplification of high frequency noise picked up in the transmission medium, and may also reduce noise introduced within the equalizer core 202.

Operationally, the input of each equalizer stage 302, 304 and 306 is coupled to the transfer function block 308, which compensates for attenuation caused by the transmission medium. The design of a circuit configured to implement the transfer function block 308 is commonly understood by those skilled in the art of communications system design. One exemplary circuit that could be utilized to implement the transfer function block 308 is described in the above referenced '515 Application.

The output of the transfer function block 308 is multiplied by the gain control signal (Ki-Gain) 226 in the multiplier 312. The gain control signal (Ki-Gain) 226 is preferably a value between zero (0) and unity (1) that is proportional to the length of the portion of the transmission media being equalized by a given equalizer stage 302, 304 or 306. By multiplying the transfer function H(f) by Ki-Gain, the gain supplied by the transfer function H(f) is varied to correspond to the losses incurred in a given length of transmission media. The value of the gain control signal (Ki-Gain) 226 is determined by the sequencer 218 as a function of the single-stage gain control K as described above with reference to FIGS. 7 and 8. The output from the multiplier 312 is then band-limited by the variable low-pass filter 310, and summed with the equalizer stage input in the adder 314, which generates the equalized output of the equalizer stage 302, 304 or 306. The bandwidth of the variable low-pass filter 310 is set by the bandwidth control signal 228 in accordance with the data rate of the signal being equalized. The function and characteristics of the variable low-pass filter are described in more detail below with reference to FIGS. 14 and 15.

In an alternative embodiment, the variable gain of the equalizer stages 302, 304 and 306 may be adjusted simultaneously according to the length of the transmission medium. For instance, instead of operating the equalizer stages 302, 304 and 306 sequentially as described above with reference to FIGS. 7 and 8, the stages 302, 304 and 306 may operate together to equalize the signal from the entire range of transmission media lengths. In this embodiment, the gain control signal (Ki-Gain) 226 for any given length of transmission medium would preferably be the same for each equalizer stage 302, 304 and 306, and Ki-Gain 226 would preferably be set such that the total signal gain is provided by the sum of the gains from each stage. For example, if the transmission medium were 120 meters, then K1-Gain, K2-Gain, and K3-Gain would preferably be set such that each equalizer stage 302, 304 and 306 provides the gain necessary to equalize a signal from a 40 meter transmission medium.

In another alternative embodiment, the equalizer core 202 may include only a single equalizer stage. In this embodiment, the gain control input 226 (Ki-Gain) to the multiplier 312 would preferably be the single-stage gain control signal (K) 231 generated at the output of the adder 216.

Figure 14:
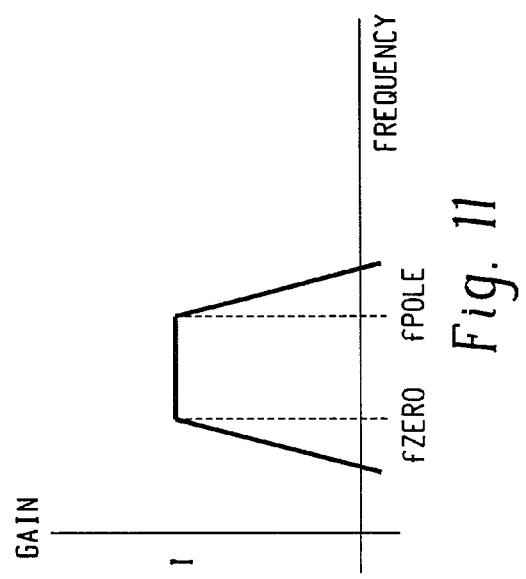
FIG. 14 is a graph showing the transfer function of a typical low-pass filter.
Figure 15:
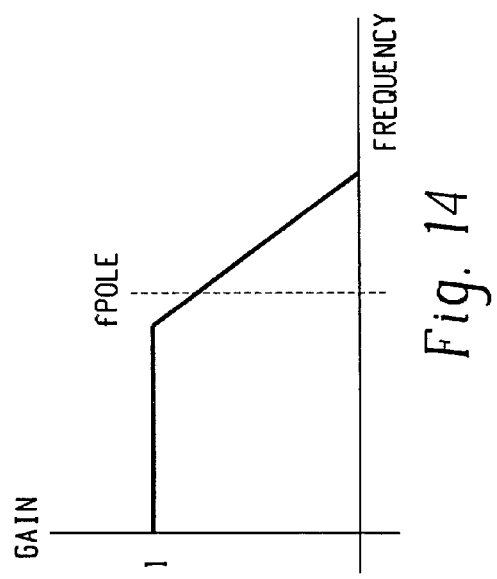
FIG. 15 is a graph showing how the transfer functions of the variable low-pass filters shown in FIG. 13 are altered by the bandwidth control signal (Ki-BW).

FIG. 14 is a graph showing the transfer function of a typical low-pass filter. FIG. 15 is a graph showing how the transfer functions of the variable low-pass filters 310 shown in FIG. 13 are altered by the bandwidth control signal (Ki-BW) 228. As a signal passes through a transmission medium it is typically corrupted by noise. In order to band-limit the inverse loss function G(f) and optimize the signal to noise ratio (SNR) of the equalizer output 222, each stage in the equalizer core 202 preferably includes a variable low-pass filter 310 having a transfer function such as that shown in FIG. 14. The low-pass filters 310 are variable in the sense that the pole frequency ($f_{pole}$) of the filters' transfer functions may be adjusted by the bandwidth control signals (Ki-BW) 228 depending upon the data rate of the transmission signal. The equalizer core 202 should preferably have a bandwidth that is commensurate with the incoming data rate. Too low a data rate may induce pattern dependent jitter due to bandwidth limitations. Similarly, too large a bandwidth may reduce the SNR. Thus, the bandwidth control signals (Ki-BW) 228 are used to adjust the bandwidth of the variable low-pass filters 310 according to the data rate of the transmission signal.

The value of the bandwidth control signals (Ki-BW) 228 and the consequent bandwidth of the variable low-pass filters 310 is set by the sequencer 218 as a function of the signal-stage gain control signal (K) 231. For example, if the value of K 231 indicates that a long transmission medium is in use, then the input signal 220 must be at a low data rate, and the bandwidth control signals (Ki-BW) 228 are set to narrow the pass-band of the variable low-pass filters 310. If, on the other hand, a short transmission medium is in use, then Ki-BW 228 is set to allow higher data rate signals to pass. Referring to FIGS. 12 and 13, as the value of K 231 increases, indicating a longer transmission medium, the value of Ki-BW 228 is increased (FIG. 15) and the pole frequency ($f_{pole}$) is moved towards the y-axis (FIG. 14) decreasing the bandwidth of the variable low-pass filters 310.

The embodiments described herein are examples of structures, systems or methods having elements corresponding to the elements of the invention recited in the claims. This written description may enable those skilled in the art to make and use embodiments having alternative elements that likewise correspond to the elements of the invention recited in the claims. The intended scope of the invention thus includes other structures, systems or methods that do not differ from the literal language of the claims, and further includes other structures, systems or methods with insubstantial differences form the literal language of the claims.

We claim:

1. An equalizer, comprising:
   an equalizer core coupled to an input signal from a transmission medium and a bandwidth control signal, wherein the equalizer core applies a transfer function to the input signal to compensate for losses incurred in the transmission medium and generates a core output signal, and wherein the bandwidth control signal controls a bandwidth of the transfer function;
   a slicer coupled to the core output signal that converts the core output signal to a digital output signal having a fixed digital output swing, wherein the fixed digital output swing approximates a swing of the input signal prior to transmission over the transmission medium; and
   an automatic gain control (AGC) loop coupled to the core output signal and the digital output signal that compares the core output signal with the digital output signal and generates the bandwidth control signal;
   wherein the AGC loop limits a bandwidth of the core output signal and the digital output signal and compares a band-limited core output signal with a band-limited digital output signal to approximate an energy difference;
   wherein the bandwidth control signal is generated by the AGC loop as a function of the energy difference;
   wherein the equalizer core comprises:
      signal and generates a transfer function output signal;
      a variable low-pass filter coupled to the transfer function output signal and the bandwidth control signal, wherein the variable low-pass filter varies the bandwidth of the transfer function output signal and generates a filter output signal; and
      an adder coupled to the input signal and the filter output signal that generates the core output signal.

2. The equalizer of claim 1, wherein the bandwidth control signal varies the bandwidth of the transfer function as a function of a data rate of the input signal.

3. The equalizer of claim 1, wherein the transfer function approximates an inverse of the losses incurred in the transmission medium.

4. The equalizer of claim 1, wherein the AGC loop also generates a gain control signal that is coupled to the equalizer core and controls a frequency dependant gain of the transfer function.

5. The equalizer of claim 4, wherein the AGC loop comprises:
   an adder that compares the core output signal with the digital output signal and generates a single-stage gain control signal, wherein the bandwidth control signal and the gain control signal are generated as a function of the single-stage gain control signal.

6. The equalizer of claim 5, wherein the AGC loop further comprises:
   a sequencer coupled to the single-stage gain control signal that generates the bandwidth control signal and the gain control signal.

7. The equalizer of claim 4, wherein the AGC loop comprises:
   a first variable band-pass filter coupled to the core output signal and a band-pass control signal that generates a first band-limited signal, wherein the band-pass control signal controls a bandwidth of the first variable band-pass filter;
   a second variable band-pass filter coupled to the digital output signal and the band-pass control signal that generates a second band-limited signal, wherein the band-pass control signal controls a bandwidth of the second variable band-pass filter;
   a first envelope detector coupled to the first band-limited signal that generates a first energy-level output;
   a second envelope detector coupled to the second band-limited signal that generates a second energy-level output;
   an adder coupled to the first energy-level output and the second energy-level output that generates a single-stage gain control signal; and
   a sequencer coupled to the single-stage gain control signal that generates the bandwidth control signal, the gain control signal, and the band-pass control signal.

8. The equalizer of claim 7, wherein the first energy-level output is coupled as negative input to the adder and the second energy-level output is coupled as a positive input to the adder.

9. The equalizer of claim 1, wherein the AGC loop also generates a gain control signal that is coupled to the equalizer core and controls a frequency dependant gain of the transfer function, and wherein the gain control signal is generated by the AGC loop as a function of the energy difference.

10. The equalizer of claim 1, wherein the transmission medium is a coaxial cable.

11. The equalizer of claim 1, wherein the transmission medium is a printed circuit board trace.

12. The equalizer of claim 1, wherein the AGC loop is implemented as a proportional (P-type) controller.

13. The equalizer of claim 1, wherein the AGC loop is implemented as an integral (I-type) controller.

14. The equalizer of claim 1, wherein the AGC loop is implemented as a combination proportional/integral (PI-type) controller.

15. The equalizer of claim 1, wherein the equalizer core comprises:
   a variable filter coupled to the input signal and the bandwidth control signal that varies the bandwidth of the transfer function.

16. The equalizer of claim 15, wherein the variable filter is a variable low-pass filter.

17. The equalizer of claim 15, wherein the variable filter implements a filter transfer function having a pole frequency, and the bandwidth control signal varies the pole frequency.

18. The equalizer of clam 1, wherein the gain control signal varies from zero to unity as the transmission medium approaches a maximum length.

19. The equalizer of claim 1, wherein the equalizer core is a multi-stage equalizer core having a plurality of individual equalizer core stages.

20. The equalizer of claim 19, wherein the individual equalizer core stages sequentially apply individual-stage transfer functions to the input signal, wherein each individual-stage transfer function is capable of compensating for a portion of the losses incurred in the transmission medium of a maximum length.

21. The equalizer of claim 19, wherein the individual equalizer core stages each supplies a substantially equal portion of a frequency dependant gain of the transfer function.

22. The equalizer of claim 1, wherein the AGC loop comprises:
a first filter coupled to the core output signal that generates a first band-limited signal; and
a second filter coupled to the digital output signal that generates a second band-limited signal;
wherein the AGC loop compares the first band-limited signal with the second band-limited signal to generate the bandwidth control signal.

23. The equalizer of claim 22, wherein the first and second filters are variable band-pass filters, and wherein the AGC loop also generates a band-pass control signal that controls a bandwidth of the variable band-pass filters.

24. The equalizer of claim 1, wherein the AGC loop comprises:
a first envelope detector coupled to the core output signal that generates a first energy-level output; and
a second envelope detector coupled to the digital output signal that generates a second energy-level output;
wherein the AGC loop compares the first energy-level output with the second energy-level output to generate the bandwidth control signal.

25. The equalizer of claim 24, wherein the first and second envelope detectors are rectifiers.

26. The equalizer of claim 1, wherein the AGC loop comprises:
an adder that compares the core output signal with the digital output signal and generates a single-stage gain control signal, wherein the bandwidth control signal is generated as a function of the single-stage gain control signal.

27. The equalizer of claim 26, wherein the AGC loop further comprises:
a sequencer coupled to the single-stage gain control signal that generates the bandwidth control signal.

28. An equalizer, comprising:
an equalizer core coupled to an input signal from a transmission medium and a bandwidth control signal, wherein the equalizer core applies a transfer function to the input signal to compensate for losses incurred in the transmission medium and generates a core output signal, and wherein the bandwidth control signal controls a bandwidth of the transfer function;
a slicer coupled to the core output signal that converts the core output signal to a digital output signal having a fixed digital output swing, wherein the fixed digital output swing approximates a swing of the input signal prior to transmission over the transmission medium; and
an automatic gain control (AGC) loop coupled to the core output signal and the digital output signal that compares the core output signal with the digital output signal and generates the bandwidth control signal;
wherein the AGC loop limits a bandwidth of the core output signal and the digital output signal and compares a band-limited core output signal with a band-limited digital output signal to approximate an energy difference;
wherein the AGC loop also varies the bandwidth of the core output signal and the digital output signal as a function of the energy difference;
wherein the equalizer core comprises:
signal and generates a transfer function output signal;
a variable low-pass filter coupled to the transfer function output signal and the bandwidth control signal, wherein the variable low-pass filter varies the bandwidth of the transfer function output signal and generates a filter output signal; and
an adder coupled to the input signal and the filter output signal that generates the core output signal.

29. The equalizer of claim 28, wherein the transmission medium is a coaxial cable.

30. The equalizer of claim 28, wherein the transmission medium is a printed circuit board trace.

31. An equalizer, comprising:
an equalizer core coupled to an input signal from a transmission medium and a bandwidth control signal, wherein the equalizer core applies a transfer function to the input signal to compensate for losses incurred in the transmission medium and generates a core output signal, and wherein the bandwidth control signal controls a bandwidth of the transfer function;
a slicer coupled to the core output signal that converts the core output signal to a digital output signal having a fixed digital output swing, wherein the fixed digital output swing approximates a swing of the input signal prior to transmission over the transmission medium; and
an automatic gain control (AGC) loop coupled to the core output signal and the digital output signal that compares the core output signal with the digital output signal and generates the bandwidth control signal;
wherein the AGC loop limits a bandwidth of the core output signal and the digital output signal and compares a band-limited core output signal with a band-limited digital output signal to approximate an energy difference;
wherein the AGC loop varies the bandwidth of the core output signal and the digital output signal as a function of a data rate of the input signal;
wherein the equalizer core comprises:
signal and generates a transfer function output signal;
a variable low-pass filter coupled to the transfer function output signal and the bandwidth control signal, wherein the variable low-pass filter varies the bandwidth of the transfer function output signal and generates a filter output signal; and
an adder coupled to the input signal and the filter output signal that generates the core output signal.

32. The equalizer of claim 31, wherein the transmission medium is a coaxial cable.

33. The equalizer of claim 31, wherein the transmission medium is a printed circuit board trace.

34. An equalizer, comprising:
an equalizer core coupled to an input signal from a transmission medium and a bandwidth control signal, wherein the equalizer core applies a transfer function to the input signal to compensate for losses incurred in the transmission medium and generates a core output signal, and wherein the bandwidth control signal controls a bandwidth of the transfer function;
a slicer coupled to the core output signal that converts the core output signal to a digital output signal having a fixed digital output swing, wherein the fixed digital output swing approximates a swing of the input signal prior to transmission over the transmission medium; and
an automatic gain control (AGC) loop coupled to the core output signal and the digital output signal that compares the core output signal with the digital output signal and generates the bandwidth control signal;
wherein the equalizer core is a multi-stage equalizer core having a plurality of individual equalizer core stage;

wherein the AGC loop generates a plurality of individual-stage bandwidth control signals, and wherein each equalizer core stages comprises:
a variable low-pass filter coupled to one of the individual-stage bandwidth control signals that varies the bandwidth of the transfer function.

35. The equalizer of claim 34, wherein the transmission medium is a coaxial cable.

36. The equalizer of claim 34, wherein the transmission medium is a printed circuit board trace.

37. A method of compensating for data rate variations in a digital equalizer, comprising the steps of:
receiving an input signal from a transmission medium, wherein the input signal has a variable data rate;
providing an equalizer core that applies a transfer function to the input signal to compensate for losses incurred in the transmission medium;
varying a bandwidth of the transfer function to compensate for variations in the variable data rate of the input signal;
providing a slicer that converts a core output signal from the equalizer core to a digital output signal having a fixed output swing that approximates a swing of the input signal prior to transmission over the transmission medium;
isolating a first frequency range in the core output signal to generate a first band-limited signal;
isolating a second frequency range in the digital output signal to generate a second band-limited signal;
comparing the first band-limited signal with the second band-limited signal to generate a bandwidth control signal, wherein the bandwidth of the transfer function is varied in proportion to the bandwidth control signal;
comparing the first band-limited signal with the second band-limited signal to generate a band-pass control signal; and
varying the first frequency range and the second frequency range in proportion to the band-pass control signal.

38. A method of compensating for data rate variations in a digital equalizer, comprising the steps of:
receiving an input signal from a transmission medium, wherein the input signal has a variable data rate;
providing an equalizer core that applies a transfer function to the input signal to compensate for losses incurred in the transmission medium;
providing a slicer that converts a core output signal from the equalizer core to a digital output signal having a fixed output swing that approximates a swing of the input signal prior to transmission over the transmission medium;
isolating a first frequency range in the core output signal to generate a first band-limited signal;
isolating a second frequency range in the digital output signal to generate a second band-limited signal;
detecting a first energy-level in the core output signal;
detecting a second energy-level in the digital output signal;
comparing the first energy-level with the second energy-level to generate a single-stage gain control signal;
varying a frequency dependant gain of the transfer function in proportion to the single-stage gain control signal; and
varying the first frequency range and the second frequency range in proportion to the single-stage gain control signal.

* * * * *